Figure 1:
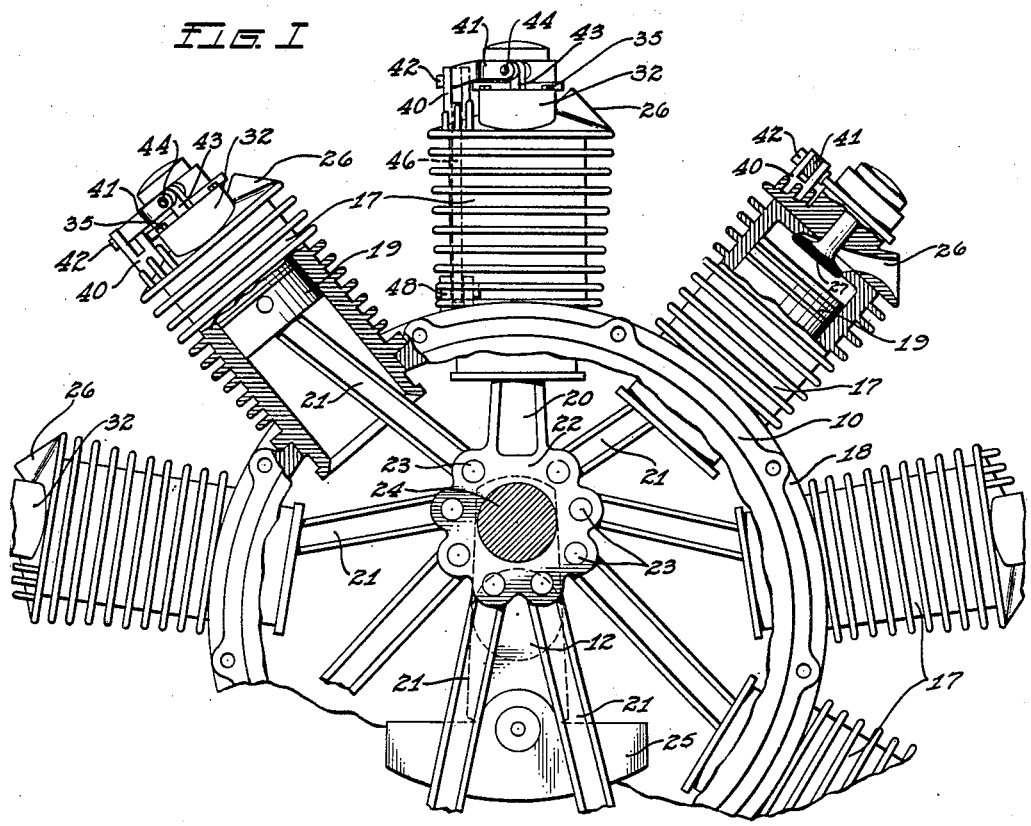

Aug. 30, 1932.  L. M. WOOLSON  1,874,683

INTERNAL COMBUSTION ENGINE

Original Filed July 21, 1930

Inventor
LIONEL M. WOOLSON, DECEASED
BY HIS EXECUTRIX
EMMA F. WOOLSON

By
Attorney

Patented Aug. 30, 1932

1,874,683

UNITED STATES PATENT OFFICE

LIONEL M. WOOLSON, DECEASED, LATE OF DETROIT, MICHIGAN, BY EMMA F. WOOLSON, EXECUTRIX, OF BLOOMFIELD VILLAGE, MICHIGAN, ASSIGNOR TO PACKARD MOTOR CAR COMPANY, OF DETROIT, MICHIGAN, A CORPORATION OF MICHIGAN

INTERNAL COMBUSTION ENGINE

Application filed July 21, 1930, Serial No. 469,329. Renewed September 30, 1931.

This invention relates to internal combustion engines, and more particularly to engines of the compression ignition type.

In engines of this class, commonly known as Diesel engines, air is drawn into the cylinder and then compressed to the point where its temperature rises sufficiently to automatically ignite the fuel, and fuel is then forced into the cylinder while the air is thus compressed. However, when such engines are cold, or have been idling, or have been running upon low fuel supply, it sometimes happens, as they have been heretofore constructed, that the air when compressed will not reach a temperature which at all times will insure ignition. It is desirable therefore to have the air compression sufficiently high to insure ignition under all conditions, but this leads to unnecessarily high pressures when the engine is working under full fuel charges.

The object of this invention, therefore, is to maintain the high compression necessary for reliable ignition when the engine is started, or when idling, and yet avoid or overcome the unnecessarily high pressures produced when the engine is working with full fuel supply.

Or, stated in another way, the object of the invention is to vary the air compression ratio inversely with the load by varying the size of the combustion chamber directly with the engine temperature.

In engines of the Diesel type, the amount of heat developed, generally speaking, is in proportion to the fuel burned. When the engine is running idly, or on reduced load, the fuel required to keep the engine running is small compared to what it is when the engine is working under normal or heavy load. The temperature of the engine, and particulary of the cylinders and cooperating parts, therefore varies with the fuel burned, although perhaps not in the exact proportion; so that, in a broad sense, the temperature of these parts varies with the load, being lowest when the engine is starting or idling, and highest when it is running under maximum load.

While the air compression when the engine is starting or idling must be sufficient to effect ignition, when the engine is running under heavy load, the heat developed thereby raises the general temperature of the engine, and this helps to raise the temperature of the air; so that, after the engine has heated up, it is not essential in order to secure satisfactory ignition that the air compression shall then be as high as when the engine is starting or idling.

With the construction here disclosed, the inventor proposes to make use of the expansion of the cylinders or combustion chambers themselves, due to changes in the temperature thereof, to vary the air compression ratio, and relieve the excessive combustion pressure. Thus, varying the size of the cylinder of combustion chamber directly with the temperature, varies the combustion pressure as well as the air compression pressure. This is so, for as the combustion chamber enlarges, due to the expansion thereof, the combustion pressure will be relieved, and the air compression pressure will be reduced.

Inasmuch as the air compression ratio of engines of this character is quite high, amounting to approximately 16 to 1, the space occupied by the air when thus compressed is quite small compared to the initial space occupied thereby; and since it is only necessary that the combined clearance volume of the cylinder and chamber together shall be from twenty to thirty per cent greater than the compression space of the working cylinder alone, this auxiliary cylinder may be relatively small, and the movement of the compensating piston quite limited.

The broad idea of varying the air compression inversely with the engine temperature has been disclosed, and mechanism for effecting this result duly claimed, in an earlier application, Serial No. 374,368, filed June 28, 1929. In that case, the compression ratio is varied by automatically varying the stroke of the pistons in the cylinders; while the invention which forms the foundation of the present application is based upon variations in the size or length of the cylinder or combustion chamber, or of some chamber supplemental thereto.

The principle may be applied to engines having one or a plurality of cylinders; as here illustrated, it is applied to a plural cylinder engine intended primarily for aeronautical work.

Figure 2:
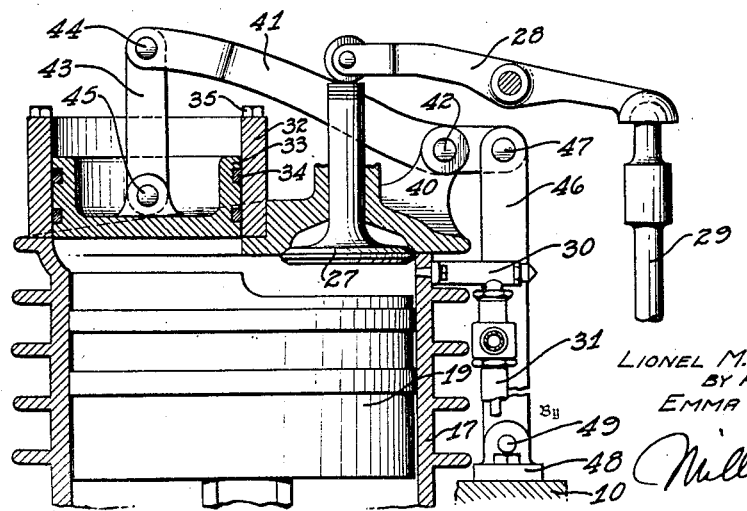

Fig. 1 is an end elevation of a multiple cylinder engine with the improvement embodied therein; and Fig. 2 is a vertical section through one of the cylinders showing more particularly the details of the construction.

Referring to the drawing, 10 represents the crank case of an internal combustion engine, which, as here shown, is more particularly intended for aeroplane use, although this invention is not limited to engines intended for this particular purpose. Within the crank case is a shaft 12 rotatable in suitable bearings, not shown herein, but illustrated and described in the earlier application, Serial No. 374,368, above referred to.

Arranged around this crank case 10 are cylinders 17 of any desired number. These cylinders are connected to the crank case in any convenient way, as by compression hoops 18. Within each cylinder is a piston 19 of usual or any preferred construction, and pivotally connected to one of these pistons is a pitman 20, and to the others are similarly connected pitmen 21. The pitman 20 is what is usually termed a master pitman, and has a hub 22 secured rigidly thereto or made integral therewith, and to this hub all of the other pitmen 21 are pivotally connected as by pins 23. The hub 22 is mounted directly upon the wrist pin 24 of the crank shaft 12 and serves to rotate the crank shaft in the usual way. One or more weights 25 of any preferred form serve to counterbalance the wrist pin and pistons. This arrangement of cylinders and pistons cooperating with a single crank shaft is old and well known, and forms no part of the present invention.

The engine here disclosed is of the four cycle type, and each cylinder is provided with an air channel 26, and a single control valve 27 therefor. The air is drawn into the cylinder through this channel 26, and the products of combustion likewise escape therethrough, the valves 27 thus serve both as inlet and outlet valves. Each valve 27 is operated by a rocker 28 and actuating rod 29, and other elements of the usual type.

Cooperating with each cylinder is a fuel supply mechanism comprising a nozzle 30 and a pump 31. These nozzles and pumps may be of any suitable construction, and are therefore here illustrated only diagrammatically. It may be said, however, that it is desirable to have a variable quantity pump for each cylinder, and to have the pump as close as possible to the nozzles with which they cooperate, so that the pumps may force the fuel directly through the nozzles into the cylinders.

Considering the operation as starting with the valve 27 open, movement of the piston down the cylinder draws air into the chamber. The valve is then closed, and on the up stroke of the piston, the air is compressed to the point where its temperature will ignite the fuel, and the fuel is then injected at or just before the time of maximum compression. The resulting combustion of the fuel raises the pressure in the cylinder still higher, and just before the piston reaches the end of its down stroke, the valve 27 is opened and the products of combustion permitted to escape; and the cylinder is entirely cleared upon the up stroke of the piston. As the piston goes down again it draws fresh air into the cylinder, and the cycle of operation repeats itself.

The top of the cylinder 17 constitutes the combustion chamber. Cooperating with this combustion chamber is the mechanism controlled by the expansion of the cylinder for increasing the clearance volume thereof, so as to enlarge this chamber upon a rise in temperature of the cylinder.

Broadly speaking, this mechanism consists of a compensating cylinder 32 arranged in the top of the cylinder 17, or as an extension or auxiliary chamber thereof; and a compensating piston 33 having the usual piston rings 34 and movable therein. As here shown, the cylinders 32 are secured to the cylinders 17 by means of bolts 35.

Mounted on each cylinder is an arm or post 40, upon which is pivoted a lever 41 at the point 42. One end of this lever 41 is several times longer than the other. The long end is pivotally secured to a link 43 at the point 44, and this link is pivotally secured to the piston 33 at the point 45. The short end of the lever 41 is pivotally connected to a post 46 at the point 47, and the post 46 is pivotally secured to the casing 10 or to some projection 48 thereof as at the point 49.

As the cylinder 17 heats up, due to the combustion of the fuel during the operation of the engine, it expands, the amount of the expansion depending upon the variations of temperature and the thermal coefficient of expansion of the material of which it is made. The post 46 does not partake of this rise in temperature, and therefore, while the cylinder elongates, the post 46 does not vary substantially in length. As the cylinder expands, it raises the pivoted point 42 of the lever 41 against the restraining effort of the post 46. This movement of the pivotal point 42 of the lever 41 causes the long end of the lever to move to an extent depending upon the expansion of the cylinder and the ratio between the long and the short members of the lever. Assuming this ratio to be 10 to 1, the lever arrangement will multiply the expansion of the cylinder 17 ten times, and this will lift the piston 33 an amount which is ten times the elongation of the cylinder. As the piston moves up in the auxiliary cylinder 32, the clearance volume of the combustion chamber is increased by the amount which the auxiliary piston rises, and the capacity of the combustion chamber or the clearance volume thereof, thus varies directly with the temperature of the cylinder; that is, the capacity of this chamber increases with a rise in the temperature, and decreases with a fall thereof. The increase in the clearance volume of the combustion chamber will decrease both the air compression pressure and the combustion pressure. Thus, while the clearance volume of the chamber varies directly with the temperature thereof, both the combustion pressure and air compression ratio vary inversely with the clearance volume.

The size of the compensating cylinder, and the length of the lever by which the same is operated, will of course depend upon various considerations. To illustrate, the operating cylinder 17, when made of the materials commonly used for that purpose, will elongate about .03 inches when the engine is running under full load. Assuming the cylinder to have a bore of four or five inches and a stroke of six inches, and assuming that it is desired to reduce the compression ratio from 16 to 1 to 12.5 to 1, a compensating cylinder two inches in diameter operated by a multiplying lever of a 10 to 1 ratio, will cause this compensating piston to rise approximately three-tenths of an inch. This would increase the clearance volume so that the compression ratio would fall from 16 to 1 approximately to 12.5 to 1. These figures are not exact, but are nearly enough exact for the purpose of illustration.

It is to be understood that various changes may be made in the details of the structure herein illustrated and described without departing from the spirit of the invention or the scope of the claims.

What is claimed is:

1. In an internal combustion engine, the combination of a combustion chamber, a piston therein, and means for varying the capacity of the chamber directly with the temperature of the engine.

2. In an internal combustion engine, the combination of a cylinder, a piston therein, and means controlled by the temperature of the cylinder for varying the capacity thereof directly with the temperature.

3. In an internal combustion engine, the combination of a combustion chamber, a piston therein, a compensating piston in the chamber, and means for varying the position of the compensating piston and thereby the capacity of the chamber directly with the temperature.

4. In an internal combustion engine, the combination of a cylinder which is variable in length with the temperature thereof, and means controlled by variations in the length of the cylinder for varying the capacity thereof directly with the temperature.

5. In an internal combustion engine, the combination of a combustion chamber, a working piston therein, an auxiliary piston therein, and means controlled by the temperature of the chamber for moving the piston to vary the capacity thereof directly with its temperature.

6. In an internal combustion engine, the combination of a combustion chamber variable in length with the temperature thereof, a working piston in the cylinder, an auxiliary chamber communicating with the combustion chamber, a compensating piston in the auxiliary chamber, and means actuated by variations in the length of the combustion chamber due to variations in temperature thereof for varying the position of the compensating piston in accordance with the temperature of the combustion chamber.

7. In an internal combustion engine, the combination of a working cylinder variable in length with the temperature thereof, a working piston in the cylinder, an auxiliary chamber in communication with the working cylinder, a compensating piston in the auxiliary chamber, a support adjacent the cylinder, a multiplying lever having one end mounted on the support and the other secured to the compensating piston, and means carried by the working cylinder upon which the lever rests so that expansion of the cylinder upon a rise in temperature thereof will effect a movement of the compensating piston to enlarge the clearance volume of the cylinder.

8. In a compression ignition engine, the combination of a cylinder, a piston therein, and means controlled by variations of the temperature of the cylinder for varying the capacity thereof directly with the temperature and thereby varying the air compression ratio inversely with the temperature of the cylinder.

9. In a compression ignition engine, the combination of a cylinder, a piston therein, an auxiliary chamber communicating with the cylinder, and means operable through variations in the length of the cylinder due to variations in temperature thereof for varying the air compression ratio inversely with the temperature of the cylinder.

10. In a compression ignition engine, the combination of a cylinder, a piston therein, an auxiliary chamber communicating with the combustion chamber, a piston in the auxiliary chamber, and means operable by changes in temperature of the engine cylinder to vary the size of the auxiliary chamber so as to vary the clearance volume directly with the temperature of the cylinder and inversely to the air compression ratio.

11. In a compression ignition engine, the combination of a plurality of cylinders, a piston in each cylinder, means cooperating with each cylinder operable by variations in the temperature thereof, and means cooperating with each cylinder and actuated by the thermal changes therein for varying the capacity of the chambers in accordance with the requirements of each.

In testimony whereof, I have hereunto subscribed my name this 17th day of July, 1930.

EMMA F. WOOLSON,
*Executrix of the Estate of Lionel M. Woolson, Deceased.*